Patented Sept. 5, 1933

1,925,396

UNITED STATES PATENT OFFICE 1,925,396

PROCESS OF PURIFYING ELECTROMETALLURGICAL PRODUCTS

Jacob S. Masin, Anniston, Ala., assignor to Swann Research, Incorporated, a corporation of Alabama No Drawing. Application November 24, 1930
Serial No. 497,844

4 Claims. (Cl. 23—208)

My invention relates to the purification of chemically inert electro-metallurgical products such as the carbides of silicon, boron, titanium, which are non-acid reacting, non-metallic and are chemically inert at ordinary or slightly elevated temperatures. These carbides are usually prepared in an electric furnace at a high temperature from raw materials which contain considerable amounts of impurities. The high temperature electric furnace process by which these substances are produced eliminates to a considerable extent the impurities associated with the raw materials, due to the high temperature existing in the furnace during the formation of these substances. However, the removal of these impurities is seldom as complete as is desirable, small traces of impurities or unreacted materials remaining on the surfaces of the crystal aggregates of which the grain is composed. These impurities are largely surface metallic or non-metallic impurities such as silicon and iron or alloys of these elements, alone or with other elements such as graphitic carbon and calcium.

The electro-metallurgical products which I have found it possible to purify by my process are largely used in the manufacture of grinding wheels, stones and refractory articles of various kinds and are usually bonded with a ceramic or plastic bond into final shape. It is desirable to have the crystalline aggregate freed, before bonding, from surface impurities of the kinds described in order that satisfactory and permanent bonds be produced.

I have now discovered that the surface impurities may be removed very simply and completely by the use of phosphoric acid. My discovery as applied to the treatment of silicon carbide grain is carried out as follows:

Approximately 3000 grams of silicon carbide grain between 12 and 36 mesh and 2100 grams of 75% orthophosphoric acid are mixed together in a carbon or graphite crucible. A graphite electrode is then inserted into the acid-grain mixture and connections made to a transformer of suitable characteristics i. e., one capable of supplying, say, between 10 and 20 volts and about 200 amperes. Connections are made from the transformer terminals to the carbon or graphite crucible and to the electrode. The current is turned on and the mass heated by conduction through the acid-grain mixture. The temperature is brought up to, say, between 250° and 340° C. and maintained for two hours. After treatment is complete the grain is removed from the crucible, washed with water and then dried. It is now suitable for bonding into various articles. The result of this treatment will be appreciated from the following analysis:

| | Surface Si | Surface Fe |
|---|---|---|
| | Percent | Percent |
| Original material | 0.21 | 0.02 |
| After treatment with phosphoric acid | 0.07 | 0.002 |

Other methods of heating may be used than the one described and satisfactory results obtained. It is also possible to treat the other electro-metallurgical products above enumerated such as boron and titanium carbide in a similar manner with satisfactory results. Acids stronger or weaker than the 75% acid mentioned in the above description may also be used; however, it is preferable to use acid of at least this strength or stronger, otherwise the heating step will be slowed down considerably while the water is evaporating.

Some conversion of the orthophosphoric acid to pyro and meta phosphoric acid takes place during the heating, however, these acids are as effective in removing the impurities as is the ortho acid, hence it will be understood that in using the term phosphoric acid I desire to include the pyro and meta phosphoric acids as well as the ortho acid.

Some variation is permissible in the temperature to which the grain is heated, depending on the time and on the amount of impurity present on the grain. In general it may be said that the higher the temperature, the shorter the time treatment and also I have found that the presence of greater amounts of impurities than indicated above require a slightly longer time or a higher temperature.

While I have described my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The process of removing surface silicon and iron impurities from non-acid reacting, non-metallic electro-metallurgical products which comprises treating said products with phosphoric acid at a temperature effective to bring about a reaction between the phosphoric acid and the impurities.

2. The process of removing surface silicon and iron impurities from silicon carbide grain which comprises treating said silicon carbide grain with phosphoric acid and then heating to a temperature high enough to effect a reaction between the impurities and the acid.

3. The process of removing surface silicon and iron impurities from silicon carbide grain which comprises treating said silicon carbide grain with phosphoric acid and then heating to at least 350° C.

4. The process of removing surface silicon and iron impurities from silicon carbide grain which comprises treating said silicon carbide grain with phosphoric acid of at least 75% equivalent $H_3PO_4$ and then heating to at least 350° C.

JACOB S. MASIN.